United States Patent
Schmidt et al.

(10) Patent No.: US 11,265,411 B1
(45) Date of Patent: Mar. 1, 2022

(54) PROTECTIVE COVER FOR ELECTRONIC TOUCHSCREEN DEVICES

(71) Applicants: Jose M. Schmidt, Naples, FL (US); Veronica Schmidt, Naples, FL (US)

(72) Inventors: Jose M. Schmidt, Naples, FL (US); Veronica Schmidt, Naples, FL (US)

(*) Notice: Subject to any disclaimer, the term of this patent is extended or adjusted under 35 U.S.C. 154(b) by 73 days.

(21) Appl. No.: 16/682,298

(22) Filed: Nov. 13, 2019

(51) Int. Cl.
*H04M 1/17* (2006.01)

(52) U.S. Cl.
CPC ..................... *H04M 1/17* (2013.01)

(58) Field of Classification Search
CPC ... H04M 1/17; A45C 2011/002; H04B 1/3888
See application file for complete search history.

(56) References Cited

U.S. PATENT DOCUMENTS

| | | |
|---|---|---|
| 5,054,063 A | 10/1991 | Lo et al. |
| D402,665 S | 12/1998 | Belgrove |
| 6,082,535 A | 7/2000 | Mitchell |
| D500,313 S | 12/2004 | Mason |
| 8,605,892 B1 | 12/2013 | Owens et al. |
| 8,774,881 B2* | 7/2014 | Johnson ............... H04B 1/3888 455/575.8 |
| 8,959,679 B1* | 2/2015 | Everds .................... A47G 9/062 5/419 |
| 9,226,559 B1* | 1/2016 | Diebel ................ H04B 1/3888 |
| 10,165,839 B2* | 1/2019 | Richardson ............ H05K 5/023 |
| 10,965,799 B2* | 3/2021 | Tavera .................... H04M 1/17 |
| 2002/0146115 A1* | 10/2002 | Zohn ........................ H04R 1/12 379/451 |
| 2003/0012371 A1 | 1/2003 | Weinstock et al. |
| 2005/0254643 A1* | 11/2005 | Hall ........................ H04M 1/17 379/452 |
| 2006/0113208 A1 | 6/2006 | Clark et al. |
| 2014/0231277 A1* | 8/2014 | Ponski ...................... A45F 5/02 206/38 |
| 2015/0001104 A1* | 1/2015 | Kim ..................... B65D 81/022 206/37 |
| 2018/0109662 A1* | 4/2018 | Scheer ..................... H04R 1/12 |
| 2018/0242704 A1* | 8/2018 | Richardson ............ A45C 11/00 |

\* cited by examiner

*Primary Examiner* — Lewis G West
(74) *Attorney, Agent, or Firm* — Loeffler IP Group, P.A.; Bryan L. Loeffler, Esq.

(57) ABSTRACT

A protective cover (1) having a flexible body (3) wherein the body is constructed from a clear material capable of adhering to a surface of an electronic touchscreen device (2), such as a smart phone or tablet, to prevent the spread of germs and viruses while not interfering with functionality of the electronic touchscreen device.

4 Claims, 2 Drawing Sheets

PROTECTIVE COVER FOR ELECTRONIC TOUCHSCREEN DEVICES

FIELD OF THE INVENTION

This invention relates to electronic touchscreen devices, such as smart phones and tablets, and more particularly a sterile disposable clear cover that fully encapsulates and prevents an electronic touchscreen device from coming into direct contact with viruses and bacteria while not interfering with the functionality of the electronic touchscreen device.

BACKGROUND OF THE INVENTION

The prevention of transferring infectious diseases is a major and ongoing concern in hospitals and similar environments. Transmission may be caused by direct contact, such as a healthcare worker examining a patient, or through indirect contact, such as a healthcare worker touching a contaminated surface.

Indirect transmission of viruses and bacteria is especially common with the use of electronic touchscreen devices, such as smart phones and tablets. For example, many individuals check their smart phones throughout the day without washing their hands. Likewise, many healthcare facilities provide tablets to patients for intake purposes and to healthcare workers for data entry and displaying information in exam rooms. These circumstances and others provide ample opportunity for viruses and bacteria to be spread to surfaces of electronic touchscreen devices, which may then be transferred to other individuals.

Therefore, a need exists for a sterile disposable clear cover that fully encapsulates and prevents an electronic touchscreen device from coming into direct contact with viruses and bacteria while not interfering with the functionality of the electronic touchscreen device.

SUMMARY OF THE INVENTION

The primary object of the present invention is to provide a sterile disposable clear cover that fully encapsulates and prevents an electronic touchscreen device from coming into direct contact with viruses and bacteria while not interfering with the functionality of the electronic touchscreen device.

An additional object of the present invention is to provide a sterile disposable clear cover that fully encapsulates and prevents an electronic touchscreen device having a socket style grip located thereon.

An additional object of the present invention is to provide a sterile disposable clear cover that provides an easy on and easy off process.

An additional object of the present invention is to provide a sterile disposable clear cover that may be used to cover other objects, such as remotes, surgical trays and so forth, wherein a temporary cover is needed to provide protection.

The present invention fulfills the above and other objects by providing a protective cover having a flexible body with an inner surface and an outer surface wherein the body is constructed from a clear material capable of adhering to a surface of an electronic touchscreen device, such as a smart phone or tablet. While in use, the body of said protective cover has a substantially rectangular-shaped planar front surface that adheres to the touchscreen display of the electronic touchscreen device, thereby allowing an individual to view the touchscreen display and to use the touchscreen display through the front surface of the body. Likewise, the body has a substantially rectangular-shaped rear surface that covers a rear surface of an electronic touchscreen device.

An aperture is located centrally on the rear surface of said body and has an elastomeric band attached around a perimeter of said aperture to the rear surface of said body. A plurality of pleats located on the rear surface of said body extend from the aperture and terminate prior to extending beyond the rear surface.

The elastomeric band provides tension on the body to stretch the front surface over the touchscreen display. In addition, the aperture and elastomeric band allow the protective cover to be attached to smart phones and tablets having phone grips attached to a rear surface of the smartphone or tablet.

The protective cover is preferably constructed out of a biodegradable disposable material that does not interfere with the functionality of a touchscreen display. In addition, the protective cover is preferably heat resistant and may be colored.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
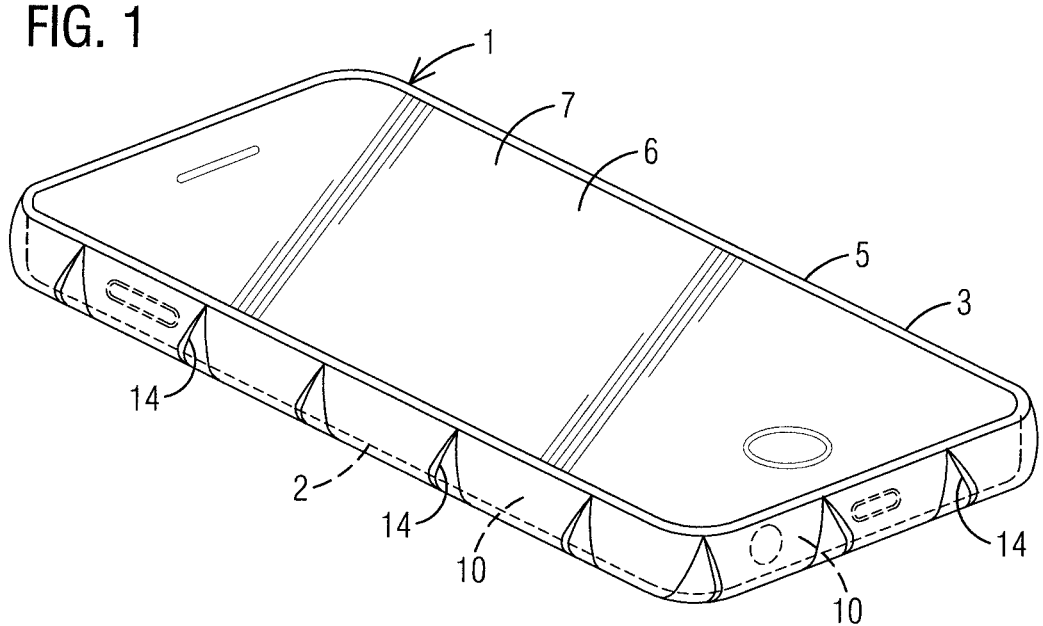
FIG. 1 is a top perspective view of a protective cover of the present invention in use an electronic touchscreen device.
Figure 2:
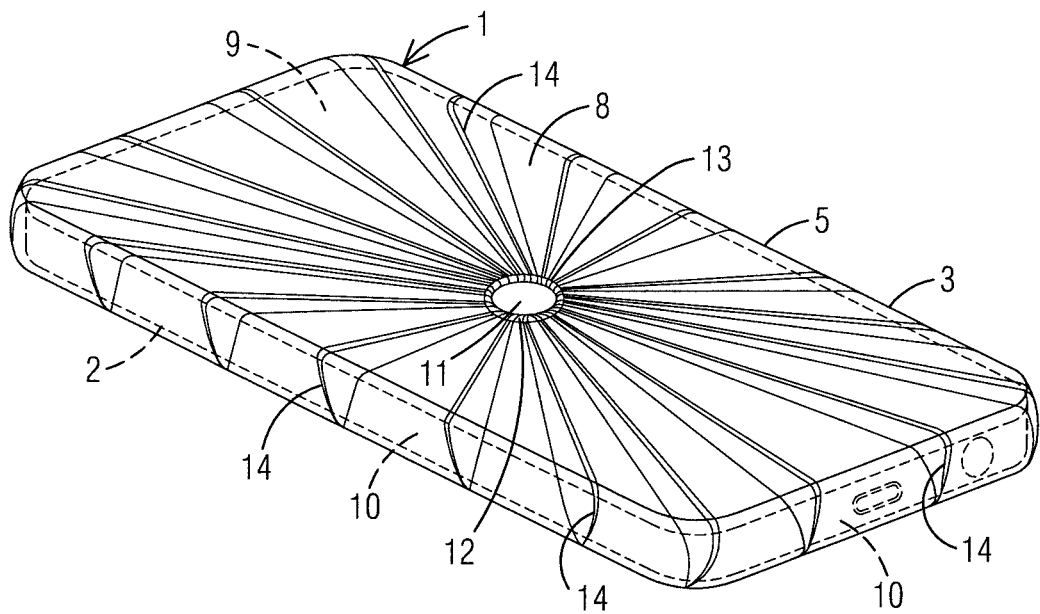
FIG. 2 is a bottom perspective view of a protective cover of the present invention in use an electronic touchscreen device.
Figure 3:
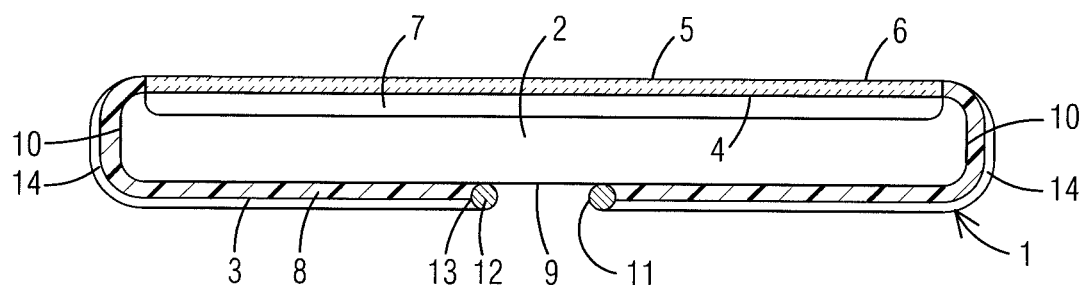
FIG. 3 is a cross sectional view along lines A-A of FIG. 1.

For purposes of describing the preferred embodiment, the terminology used in reference to the numbered accessories in the drawings is as follows:

1. protective cover, generally
 2. electronic touchscreen device
 3. body of protective cover
 4. inner surface
 5. outer surface
 6. front portion of body
 7. touchscreen display
 8. rear portion of body
 9. rear surface of electronic touchscreen device
 10. side surface of electronic touchscreen device
 11. aperture
 12. elastomeric band
 13. perimeter of aperture
 14. pleat
 15. socket grip With reference to FIGS. 1-3, a protective cover 1 of the present invention in use on an electronic touchscreen device 2 is illustrated. The protective cover 1 comprises a flexible body 3 having an inner surface 4 and an outer surface 5 wherein the body 3 conforms to an outer surface of an electronic touchscreen device 2, such as a smartphone or tablet. While in use, the flexible body 3 of said protective cover 1 forms a substantially rectangular-shaped planar front portion 6 that adheres to a touchscreen display 7 of the smart phone 2 preferably via a static cling, as illustrated in FIG. 3. The front portion 6 of said body 3 is clear to allow an individual to view the touchscreen display 7 and to use the touchscreen display 7 through the front portion 6 of said body 3. Likewise, the body 3 has a substantially rectangular-shaped rear portion 8 that covers a rear surface 9 and side surfaces 10 of an electronic touchscreen device 2.

An aperture 11 is located centrally on the rear portion 8 of said body 3 and has an elastomeric band 12 attached around a perimeter 13 of said aperture 11. The elastomeric band 12 is capable of stretching around an electronic touchscreen device 2, such as a smartphone or tablet, and then retracting to tighten the body 3 around the electronic touchscreen device 2. A plurality of pleats 14 located on the rear portion 8 of said body 3 each extend from the aperture 11 and terminate prior to extending beyond the rear portion 8. The elastomeric band 12 provides tension on the body 3 to stretch the front portion 6 of said body 3 over the touchscreen display 7.

Figure 4:
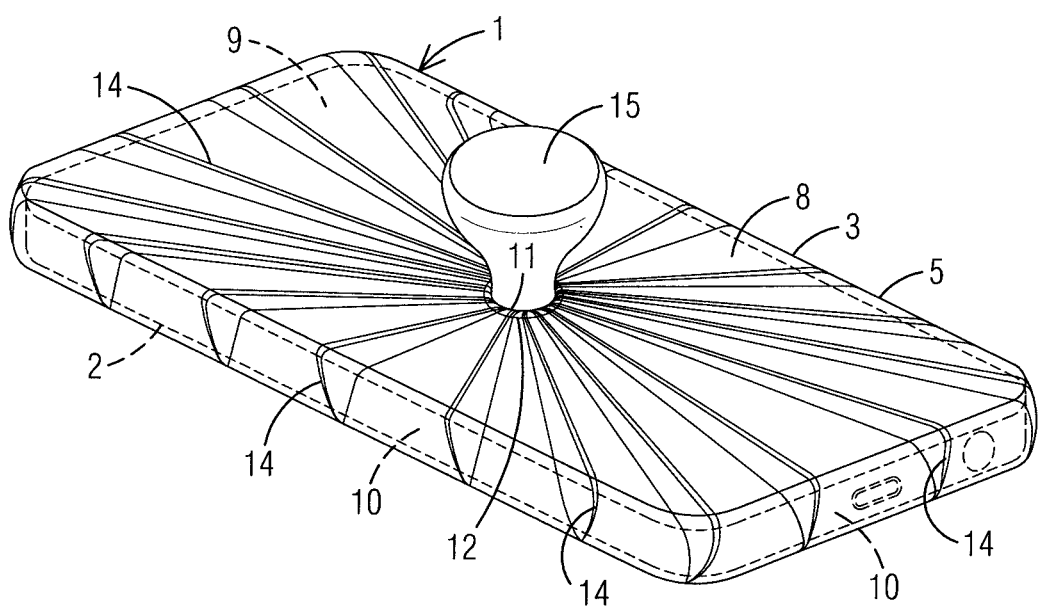
FIG. 4 is a bottom perspective view of a protective cover of the present invention in use an electronic touchscreen device having a socket grip located thereon.

With reference to FIG. 4, a bottom perspective view of a protective cover 1 of the present invention in use on an electronic touchscreen device 2 having a socket grip 15 located thereon is illustrated. The aperture 11 and elastomeric band 12 allow the protective cover 1 to be attached to and electronic touch screen device 2 having a socket grip 15 attached to a rear surface 9 of the electronic touch screen device 2.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described our invention, we claim:

1. A protective cover for an electronic touchscreen device wherein said protective cover comprises:
    a flexible body having an inner surface and an outer surface wherein the flexible body conforms to an outer surface of an electronic touchscreen device when the flexible body is placed over the electronic touchscreen device;
    said flexible body forming a substantially rectangular-shaped planar front portion while in use;
    said rectangular-shaped planar front portion capable of adhering to a touchscreen display of the electronic touchscreen device;
    said rectangular-shaped planar front portion being clear to allow an individual to view the touchscreen display;
    said flexible body forming a substantially rectangular-shaped rear portion while in use that covers a rear surface and side surfaces of the electronic touchscreen device;
    an aperture located centrally on the rectangular-shaped rear portion of said flexible body;
    an elastomeric band attached around a perimeter of said aperture; and
    said rectangular-shaped planar front portion being capable of adhering to the touchscreen display of the electronic touchscreen device via said elastomeric band stretching around the electronic touchscreen device and then retracting to tighten the flexible body around the electronic touchscreen device, thereby allowing an individual to view the touchscreen display and to use the touchscreen display through the front surface of the flexible body.

2. The protective cover of claim 1 wherein:
    said elastomeric band being capable of stretching around an electronic touchscreen device and then retracting to tighten the flexible body around the electronic touchscreen device.

3. The protective cover of claim 1 further comprising:
    a plurality of pleats located on the rectangular-shaped rear portion of said flexible body.

4. A protective cover for an electronic touchscreen device wherein said protective cover comprises:
    a flexible body having an inner surface and an outer surface wherein the flexible body conforms to an outer surface of an electronic touchscreen device when the flexible body is placed over the electronic touchscreen device;
    said flexible body forming a substantially rectangular-shaped planar front portion while in use;
    said rectangular-shaped planar front portion capable of adhering to a touchscreen display of the electronic touchscreen device;
    said rectangular-shaped planar front portion being clear to allow an individual to view the touchscreen display;
    said flexible body forming a substantially rectangular-shaped rear portion while in use that covers a rear surface and side surfaces of the electronic touchscreen device;
    an aperture located centrally on the rectangular-shaped rear portion of said flexible body;
    an elastomeric band attached around a perimeter of said aperture; and
    said rectangular-shaped planar front portion being capable of adhering to the touchscreen display of the electronic touchscreen device via said elastomeric band stretching around the electronic touchscreen device and then retracting to tighten the flexible body around the electronic touchscreen device, thereby allowing an individual to view the touchscreen display and to use the touchscreen display through the front surface of the flexible body.

\* \* \* \* \*